US012566624B2

(12) United States Patent
Sinha et al.

(10) Patent No.: US 12,566,624 B2
(45) Date of Patent: Mar. 3, 2026

(54) COMMUNICATION BETWEEN CONTROL PLANES IN A VIRTUALIZED COMPUTING SYSTEM HAVING AN AUTONOMOUS CLUSTER

(71) Applicant: VMWARE, INC., Palo Alto, CA (US)

(72) Inventors: Sandeep Sinha, Bangalore (IN); Akash Kodenkiri, Bangalore (IN); Varun Rajasekar, Chennai (IN); Prachi Singhal, Bangalore (IN); Ivailo Vladimirov Loboshki, Sofia (BG); Dimitar Dimitrov, Sofia (BG); Hakan Sunay Halil, Sofia (BG)

(73) Assignee: VMware LLC, Palo Alto, CA (US)

( * ) Notice: Subject to any disclaimer, the term of this patent is extended or adjusted under 35 U.S.C. 154(b) by 915 days.

(21) Appl. No.: 17/722,428

(22) Filed: Apr. 18, 2022

(65) Prior Publication Data

US 2023/0229484 A1     Jul. 20, 2023

(30) Foreign Application Priority Data

Jan. 17, 2022     (IN) .............................. 202241002630

(51) Int. Cl.
| | |
|---|---|
| *G06F 9/455* | (2018.01) |
| *G06F 9/445* | (2018.01) |
| *G06F 9/50* | (2006.01) |
| *G06F 9/54* | (2006.01) |

(52) U.S. Cl.
CPC ........ *G06F 9/45558* (2013.01); *G06F 9/5072* (2013.01); *G06F 2009/4557* (2013.01); *G06F 2009/45587* (2013.01)

(58) Field of Classification Search
CPC ............. G06F 9/45533; G06F 9/45558; G06F 9/5072; G06F 2009/4557; G06F 2009/45587
See application file for complete search history.

(56) References Cited

U.S. PATENT DOCUMENTS

| | | | |
|---|---|---|---|
| 11,016,816 | B1 | 5/2021 | Gupta et al. |
| 2013/0125112 | A1 | 5/2013 | Mittal et al. |
| 2015/0063166 | A1 | 3/2015 | Sif et al. |
| 2015/0089034 | A1 | 3/2015 | Stickle et al. |
| 2018/0024537 | A1 | 1/2018 | Chauvet et al. |

(Continued)

OTHER PUBLICATIONS

Non-Final Office Action mailed Dec. 23, 2024 in U.S. Appl. No. 17/722,417, 14 pages.

(Continued)

*Primary Examiner* — Kostas J Katsikis
(74) *Attorney, Agent, or Firm* — Kim & Stewart LLP

(57) ABSTRACT

An example method of establishing trust between a cross-cluster control plane (xCCP) and a cluster control plane (CCP) of an autonomous cluster of hosts in a virtualized computing system includes: providing, by the xCCP, trust data of the xCCP to a hypervisor of a host in the autonomous cluster that is executing the CCP; providing, by the hypervisor, the trust data to the CCP through a volume attached to a virtual machine (VM) that executes the CCP; persisting, by the CCP, the trust data in a database; and accessing, by a security token service (STS) of the CCP, the trust data in the database to authenticate access to the CCP by the xCCP.

20 Claims, 14 Drawing Sheets

(56) References Cited

U.S. PATENT DOCUMENTS

| | | | |
|---|---|---|---|
| 2018/0063193 A1 | 3/2018 | Chandrashekhar et al. | |
| 2018/0123900 A1 | 5/2018 | Dorr et al. | |
| 2018/0262387 A1* | 9/2018 | Mathew | G06F 9/45558 |
| 2019/0036868 A1* | 1/2019 | Chandrashekhar | H04L 45/021 |
| 2020/0007405 A1* | 1/2020 | Chitalia | H04L 41/14 |
| 2020/0403915 A1 | 12/2020 | Boutros et al. | |
| 2021/0224093 A1 | 7/2021 | Fu et al. | |
| 2021/0281548 A1* | 9/2021 | Ackerly | H04L 67/60 |
| 2022/0006801 A1* | 1/2022 | Jankowski | H04L 63/0807 |
| 2022/0100491 A1 | 3/2022 | Voltz et al. | |
| 2022/0164208 A1 | 5/2022 | Olmsted-Thompson | |
| 2022/0188172 A1* | 6/2022 | Gupta | G06F 9/5044 |
| 2022/0191025 A1* | 6/2022 | Srivastava | H04L 9/321 |
| 2022/0229687 A1 | 7/2022 | Singhal et al. | |
| 2022/0322090 A1* | 10/2022 | Gorai | H04W 12/0431 |

OTHER PUBLICATIONS

Kitahara, H. et al. "Real-time Container Integrity Monitoring for Large-Scale Kubernetes Cluster," Journal of Information Processing, vol. 29, Sep. 2021, pp. 505-514.
Non-Final Office Action mailed Oct. 9, 2024 in U.S. Appl. No. 17/722,422, 14 pages.
Final Office Action mailed Jun. 4, 2025 in U.S. Appl. No. 17/722,417, 17 pages.

* cited by examiner

512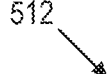
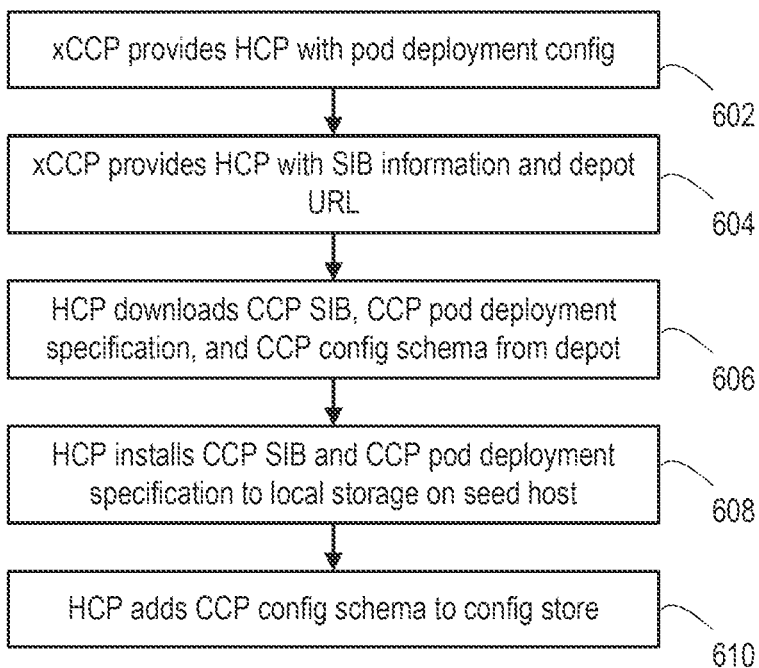
xCCP provides HCP with pod deployment config
602
xCCP provides HCP with SIB information and depot URL
604
HCP downloads CCP SIB, CCP pod deployment specification, and CCP config schema from depot
606
HCP installs CCP SIB and CCP pod deployment specification to local storage on seed host
608
HCP adds CCP config schema to config store
610
FIG. 6

514

516

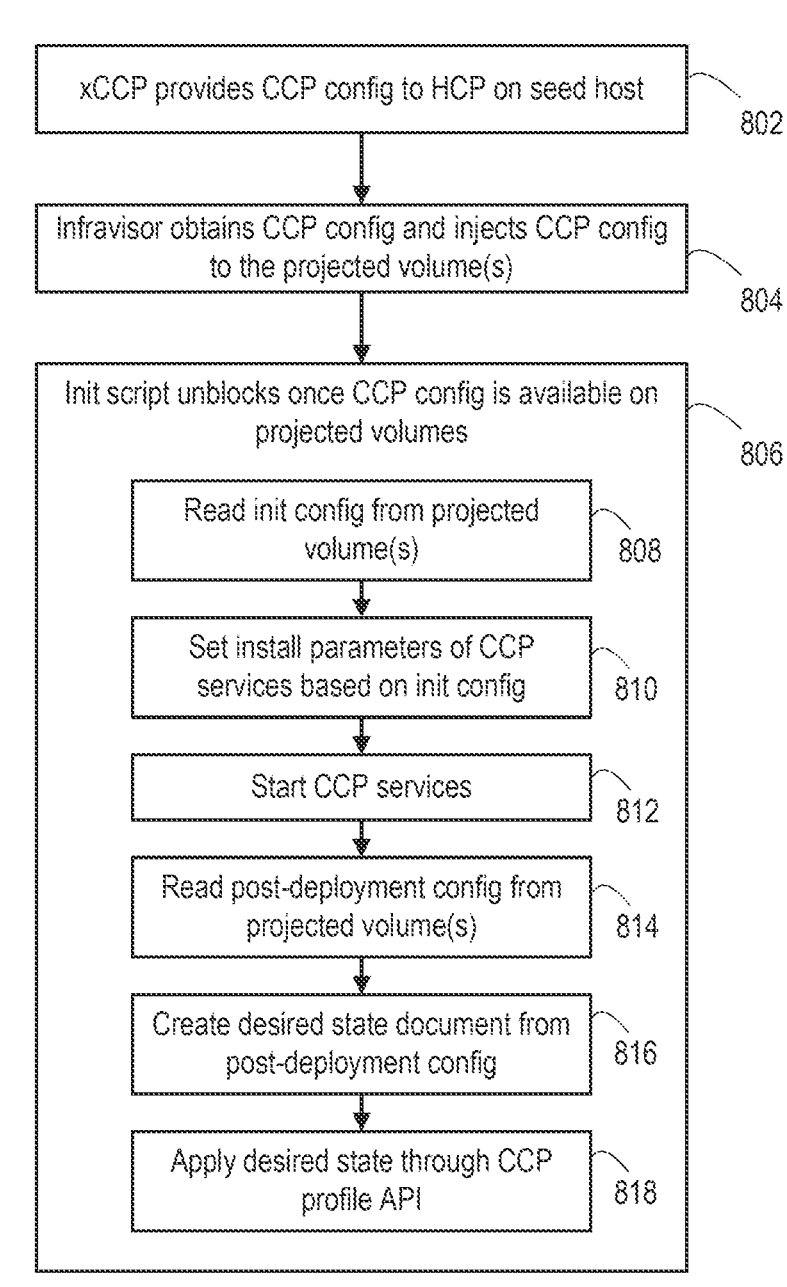

xCCP provides CCP config to HCP on seed host — 802

Infravisor obtains CCP config and injects CCP config to the projected volume(s) — 804

Init script unblocks once CCP config is available on projected volumes — 806

Read init config from projected volume(s) — 808

Set install parameters of CCP services based on init config — 810

Start CCP services — 812

Read post-deployment config from projected volume(s) — 814

Create desired state document from post-deployment config — 816

Apply desired state through CCP profile API — 818

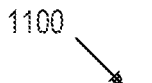
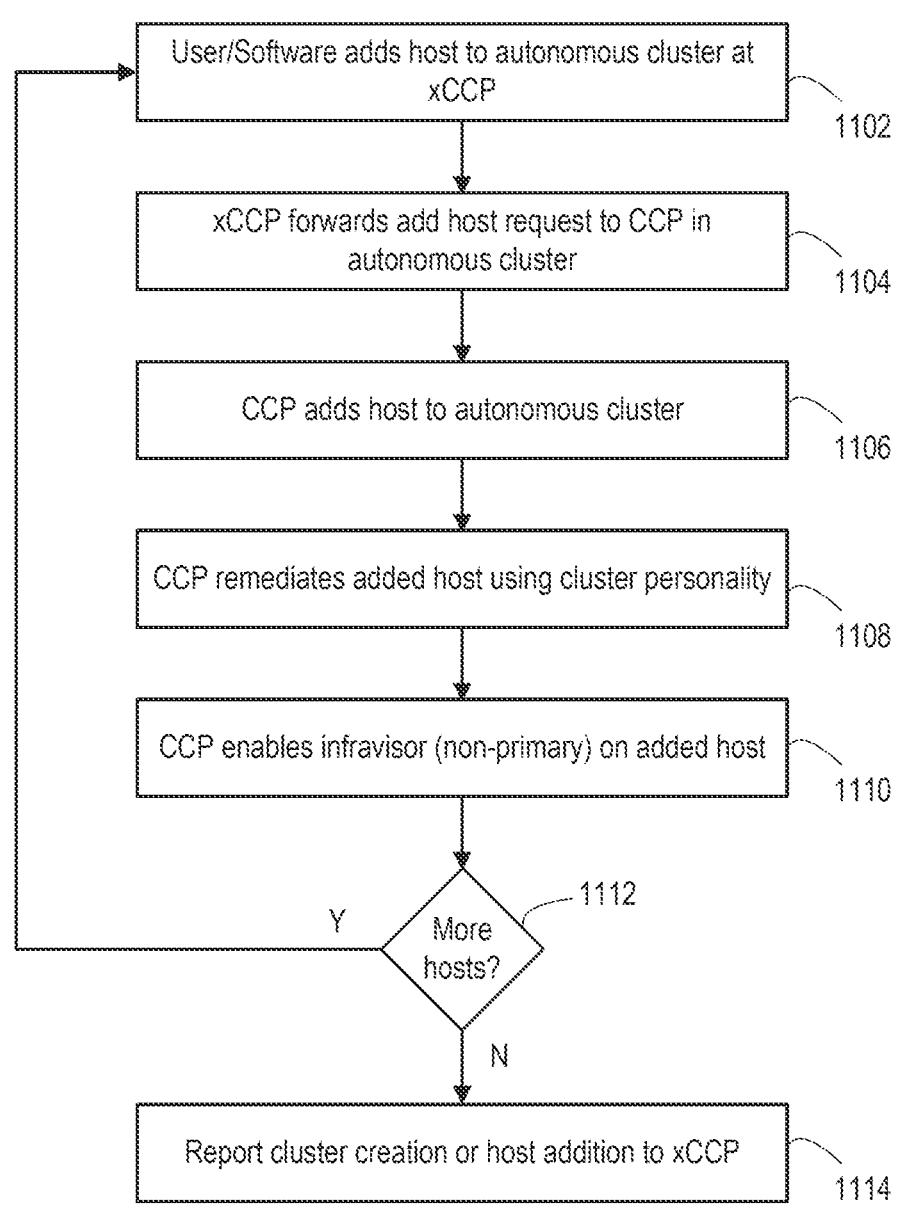
1100
| User/Software adds host to autonomous cluster at xCCP | 1102 |
xCCP forwards add host request to CCP in autonomous cluster — 1104
CCP adds host to autonomous cluster — 1106
CCP remediates added host using cluster personality — 1108
CCP enables infravisor (non-primary) on added host — 1110
More hosts? — 1112
Y
N
Report cluster creation or host addition to xCCP — 1114
FIG. 11

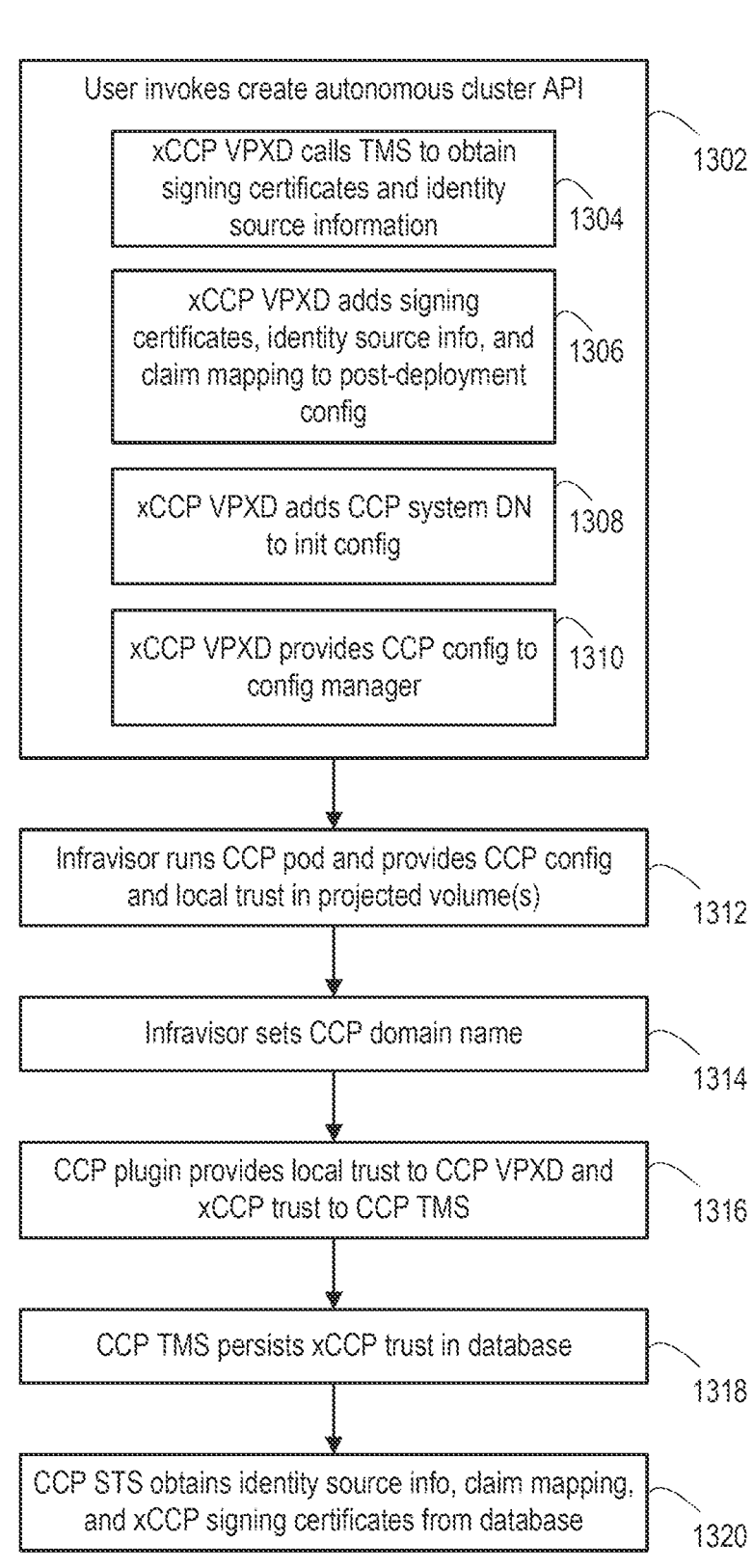

1300

User invokes create autonomous cluster API — 1302 xCCP VPXD calls TMS to obtain signing certificates and identity source information — 1304 xCCP VPXD adds signing certificates, identity source info, and claim mapping to post-deployment config — 1306 xCCP VPXD adds CCP system DN to init config — 1308 xCCP VPXD provides CCP config to config manager — 1310

Infravisor runs CCP pod and provides CCP config and local trust in projected volume(s) — 1312

Infravisor sets CCP domain name — 1314

CCP plugin provides local trust to CCP VPXD and xCCP trust to CCP TMS — 1316

CCP TMS persists xCCP trust in database — 1318

CCP STS obtains identity source info, claim mapping, and xCCP signing certificates from database — 1320

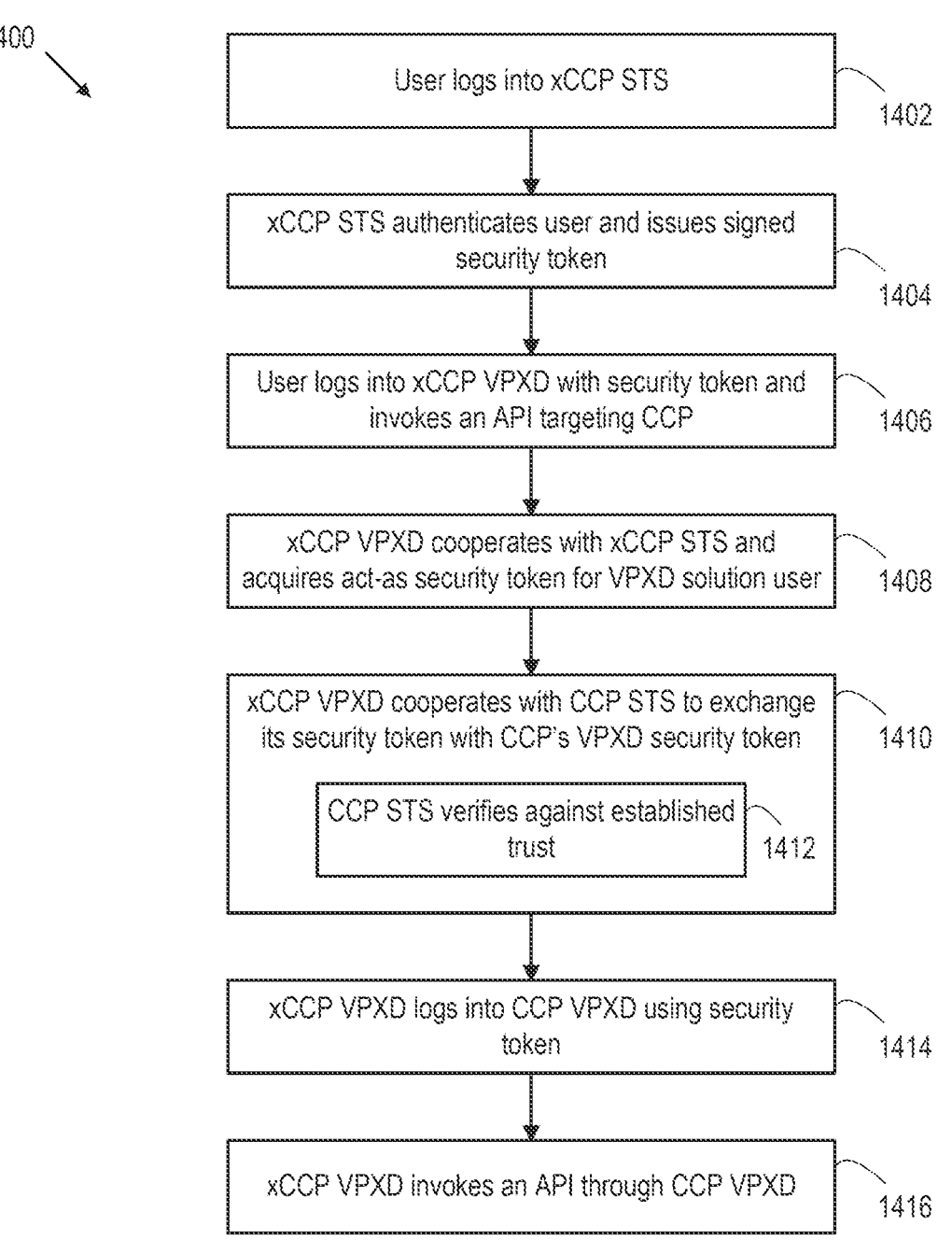

User logs into xCCP STS

1402 xCCP STS authenticates user and issues signed security token

1404

User logs into xCCP VPXD with security token and invokes an API targeting CCP

1406 xCCP VPXD cooperates with xCCP STS and acquires act-as security token for VPXD solution user

1408 xCCP VPXD cooperates with CCP STS to exchange its security token with CCP's VPXD security token

1410

CCP STS verifies against established trust

1412 xCCP VPXD logs into CCP VPXD using security token

1414 xCCP VPXD invokes an API through CCP VPXD

COMMUNICATION BETWEEN CONTROL PLANES IN A VIRTUALIZED COMPUTING SYSTEM HAVING AN AUTONOMOUS CLUSTER

RELATED APPLICATIONS

Benefit is claimed under 35 U.S.C. 119(a)-(d) to Foreign Application Serial No. 202241002630 filed in India entitled "COMMUNICATION BETWEEN CONTROL PLANES IN A VIRTUALIZED COMPUTING SYSTEM HAVING AN AUTONOMOUS CLUSTER", on Jan. 17, 2022, by VMware, Inc., which is herein incorporated in its entirety by reference for all purposes.

The present application is related in subject matter to U.S. patent application Ser. No. 17/722,417, U.S. patent application Ser. No. 17/722,422, which is incorporated herein by reference.

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

For such host clusters, the virtualization management server is a central component. Control and management planes for a host cluster are lost in case the virtualization management server fails for any reason (i.e., unplanned downtime) or needs to be upgraded (i.e., planned downtime). Along with workloads, users expect the infrastructure management and control plane to be available with high probability and uptime. Thus, it is desirable to mitigate the virtualization management server as a central point of failure.

SUMMARY

Embodiments include a method of establishing trust between a cross-cluster control plane (xCCP) and a cluster control plane (CCP) of an autonomous cluster of hosts in a virtualized computing system. The method includes: providing, by the xCCP, trust data of the xCCP to a hypervisor of a host in the autonomous cluster that is executing the CCP; providing, by the hypervisor, the trust data to the CCP through a volume attached to a virtual machine (VM) that executes the CCP; persisting, by the CCP, the trust data in a database; and accessing, by a security token service (STS) of the CCP, the trust data in the database to authenticate access to the CCP by the xCCP.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

FIG. 6 is a flow diagram depicting a method of installing a CCP to a seed host according to an embodiment.

FIG. 8 is a flow diagram depicting a method of configuring a CCP on a seed host according to embodiments.

FIG. 11 is a flow diagram depicting a method of adding hosts to a bootstrapped autonomous cluster according to embodiments.

FIG. 13 is a flow diagram depicting a method of bootstrapping trust between an xCCP and an autonomous duster according to an embodiment.

FIG. 14 is a flow diagram depicting a method of invoking an API of CCP in an autonomous cluster according to an embodiment.

DETAILED DESCRIPTION

Figure 1A:
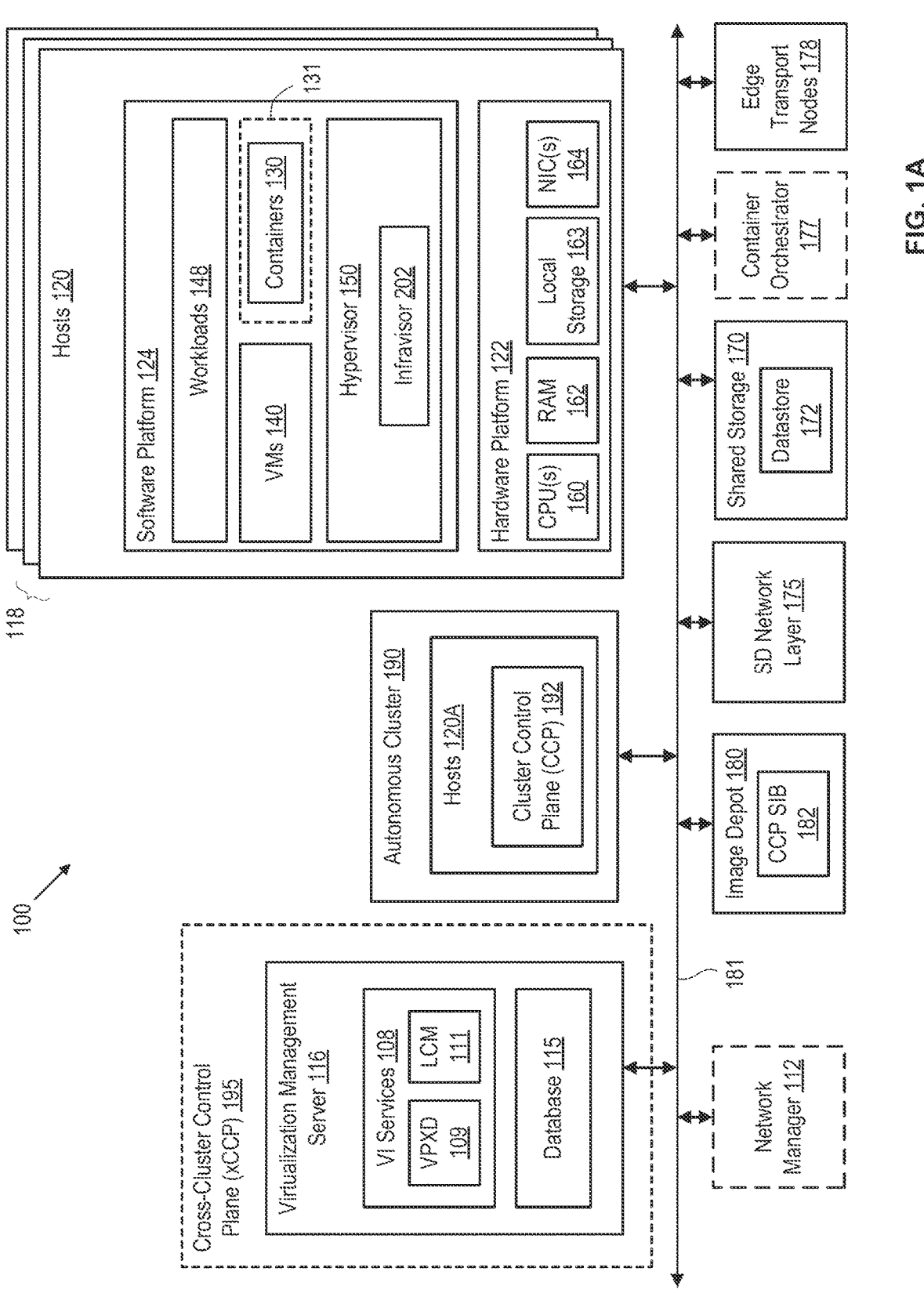
FIG. 1A is a block diagram of a virtualized computing system in which embodiments described herein may be implemented.

FIG. 1A is a block diagram of a virtualized computing system 100 in which embodiments described herein may be implemented. Virtualized computing system 100 includes hosts 120 that may be constructed on server-grade hardware platforms such as an x86 architecture platforms. One or more groups of hosts 120 can be managed as clusters 118 (also referred to as traditional clusters). Hosts 120 can include hosts 120A that are not managed as clusters 118. One or more groups of hosts 120A can be instead managed as autonomous clusters 190. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 181. Physical network 181 enables communication between hosts 120 and between other components and hosts 120 (other components discussed further herein).

In the embodiment illustrated in FIG. 1A, hosts 120 access shared storage 170 by using NICs 164 to connect to network 181. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA. Workloads 148 (e.g., applications) execute on guest operating systems in VMs 140.

Virtualized computing system 100 is configured with a software-defined (SD) network layer 175. SD network layer 175 includes logical network services executing on virtualized infrastructure of hosts 120. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to wide area network (WAN) (e.g., a corporate network, the public Internet, etc.). Edge transport nodes 178 can include a gateway (e.g., implemented by a router) between the internal logical networking of host cluster 118 and the external network. Edge transport nodes 178 can be physical servers or VMs. Virtualized computing system 100 also includes physical network devices (e.g., physical routers/switches) as part of physical network 181, which are not explicitly shown.

Virtualization management server 116 is a physical or virtual server that manages hosts 120 and the virtualization layers therein. Virtualization management server 116 installs agent(s) in hypervisor 150 to add a host 120 as a managed entity. Virtualization management server 116 can logically group hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118. In such embodiments, virtualization management server 116 provides control and management planes for host cluster(s) 118 directly (i.e., such host clusters are dependent on centralized control and management planes implemented by virtualization management server 116). In other embodiments, virtualization management server functions as a cross-cluster control plane (xCCP) 195 for managing one or more autonomous clusters 190 of hosts 120A, as discussed further below.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents in hypervisor 150 to add a host 120 as a managed entity, referred to as a transport node. One example of an SD networking platform that can be configured and used in embodiments described herein as network manager 112 and SD network layer 175 is a VMware NSX® platform made commercially available by VMware, Inc. of Palo Alto, CA. In other embodiments, SD network layer 175 is orchestrated and managed by virtualization management server 116 or xCCP 195.

Virtualization management server 116 can include various virtual infrastructure (VI) services 108. VI services 108 include a management daemon referred to herein as "VPXD 109" and a lifecycle manager (LCM) 111. VI services 108 can include various additional services, such as a distributed resource scheduler (DRS), high-availability (HA) service, single sign-on (SSO) service, and the like. VI services 108 persist data in a database 115. VPXD 109 is configured to create, update, delete objects, such as data centers, clusters, hosts, VMs, resource pools, datastores, and the like. VPXD 109 is a centralized management process configured to cooperate with other VI services 108 for object management. LCM 111 is configured to manage the lifecycle of software installed on hosts 120, including hypervisor 150 and its components. Lifecycle management includes installation of software, maintenance of installed software through updates and upgrades, and uninstalling the software. LCM 111 maintains a desired host state for hosts 120 of a cluster 118, which is referred to herein as a cluster personality. The cluster personality includes a target software specification and a target configuration for each host 120 in a cluster 118 (e.g., each host 120 under management of LCM 111). The software specification can include a software image to be installed on each host 120 to implement hypervisor 150. Hypervisor 150 in each host 120 includes a running image. LCM 111 manages hosts 120 such that their running image conforms to the cluster personality. For example, LCM 111 can install an image specified by the cluster personality to one or more hosts 120. In case the running image differs from the cluster personality image, LCM 111 can perform remediation of host(s) 120. Remediation includes updating, patching, upgrading, uninstalling, installing, and the like to cause the running image to conform to the cluster personality. The functionality of LCM 111 discussed above is applicable to when virtualization management server 116 directly provides the control and management plane for a cluster 118. The functionality of LCM 111 with respect to an autonomous cluster 190 is discussed further below.

Users interact with VI services 108 through user interfaces, application programming interfaces (APIs), and the like to issue commands, such as forming a host cluster 118, configuring resource pools, define resource allocation policies, configure storage and networking, and the like. In embodiments, users interact with VPXD 109 to create and manage autonomous clusters 190, as described further herein.

In embodiments, workloads 148 can also execute in containers 130. In embodiments, hypervisor 150 can support containers 130 executing directly thereon. In other embodiments, containers 130 are deployed in VMs 140 or in specialized VMs referred to as "pod VMs 131." A pod VM 131 is a VM that includes a kernel and container engine that supports execution of containers, as well as an agent (referred to as a pod VM agent) that cooperates with a controller executing in hypervisor 150. In embodiments, virtualized computing system 100 can include a container orchestrator 177. Container orchestrator 177 implements an orchestration control plane, such as Kubernetes®, to deploy and manage applications or services thereof in pods on hosts 120 using containers 130. Container orchestrator 177 can include one or more master servers configured to command and configure controllers in hypervisors 150. Master server (s) can be physical computers attached to network 181 or implemented by VMs 140/131 in a host cluster 118.

In embodiments, xCCP 195, implemented by virtualization management server 116, is responsible for managing one or more autonomous clusters 190 through its cluster control plane (CCP) 192 (and optionally one or more traditional clusters). While shown logically separate for purposes of explanation, autonomous cluster 190 includes a plurality of hosts 120 that are not part of any cluster 118 directly managed by virtualization management server 116. That is, hosts 120 include hosts 120A that are part of autonomous cluster(s) and under management of the CCP(s) thereof rather than virtualization management server 116. For hosts 120A, virtualization management server 116 functions as xCCP 195. Hypervisor 150 can include an infravisor 202 as a component thereof. Infravisor 202 provides a controller for executing CCP 192, providing configuration information to CCP 192, and monitoring health of CCP 192. xCCP 195 enables infravisor 202 in hypervisor 150 for those hosts 120A that are part of an autonomous cluster 190. For a host 120 in a cluster 118, infravisor 202 can be disabled.

In general, xCCP 195 is configured to provide a centralized control plane aggregating multiple cluster control planes of autonomous clusters 190; provides APIs for user/software access; exposes cross-autonomous-cluster operations; and manages global objects above autonomous clusters 190 in the data center (e.g., shared storage 170). For xCCP 195, VPXD 109 exposes an API for creating an autonomous cluster 190. Users can call this API to initiate an autonomous cluster bootstrap process, described further below. In this context, VPXD 109 functions as a coordinator for the autonomous cluster bootstrapping process. VPXD 109 initiates execution of a workflow for bootstrapping an autonomous cluster 190 and reports the result of the workflow to the user. VPXD 109 maintains a global cross-autonomous-cluster inventory in database 115. VPXD 109 can create a datastore 172 in shared storage 170 for each autonomous cluster 190. For xCCP 195, LCM 111 does not manage cluster personality for autonomous clusters 190. Rather, LCM 111 delegates that responsibility to an LCM executing as part of CCP 192. In this context, LCM 111 functions as a high-level aggregator and can extract autonomous cluster personality from CCP 192 and display the cluster personalities to users.

In embodiments, virtualized computing system 100 includes image depot 180. Image depot 180 stores software installation bundles (SIBs) and associated metadata. An image includes a plurality of components, each of which includes one or more SIBs. The components can be logically organized into component collections, such as a base image, add-ons, firmware/drivers, and the like. Each SIB includes metadata (e.g., included in an extensible markup language (XML) file), a signature, and one or more payloads. A payload includes a file archive. In the embodiments, a component is a unit of shipment and installation, and a successful installation of a component typically will appear to the end user as enabling some specific feature of hypervisor 150. For example, if a software vendor wants to ship a user-visible feature that requires a plug-in, a driver, and a solution, the software vendor will create separate SIBs for each of the plug-in, the driver, and the solution, and then group them together as one component. From the end user's perspective, it is sufficient to install this one component onto a server to enable this feature on the server. A component may be part of a collection, such as a base image or an add-on, as further described below, or it may be a stand-alone component. In embodiments, image depot 180 stores a CCP SIB 182, which can be a stand-alone component to be installed in a host 120 for implementing CPP 192, as described further below.

A "base image" is a collection of components that are sufficient to boot up a server with the virtualization software. For example, the components for the base image include a core kernel component and components for basic drivers and in-box drivers. The core kernel component is made up of a kernel payload and other payloads that have inter-dependencies with the kernel payload. According to embodiments, the collection of components that make up the base image is packaged and released as one unit.

An "add-on" or "add-on image" is a collection of components that an original equipment manufacturer (OEM) wants to bring together to customize its servers. Using add-ons, the OEM can add, update or remove components that are present in the base image. The add-on is layered on top of the base image and the combination includes all the drivers and solutions that are necessary to customize, boot up and monitor the OEM's servers. Although an "add-on" is always layered on top of a base image, the add-on content and the base image content are not tied together. As a result, an OEM is able to independently manage the lifecycle of its releases. In addition, end users can update the add-on content and the base image content independently of each other.

"Solutions" are features that indirectly impact the desired image when they are enabled by the end user. In other words, the end-user decides to enable the solution in a user interface but does not decide what components to install. The solution's management layer decides the right set of components based on constraints. Examples solutions include HA (high availability), NSX (network virtualization platform), and autonomous clusters as described below.

Figure 1B:
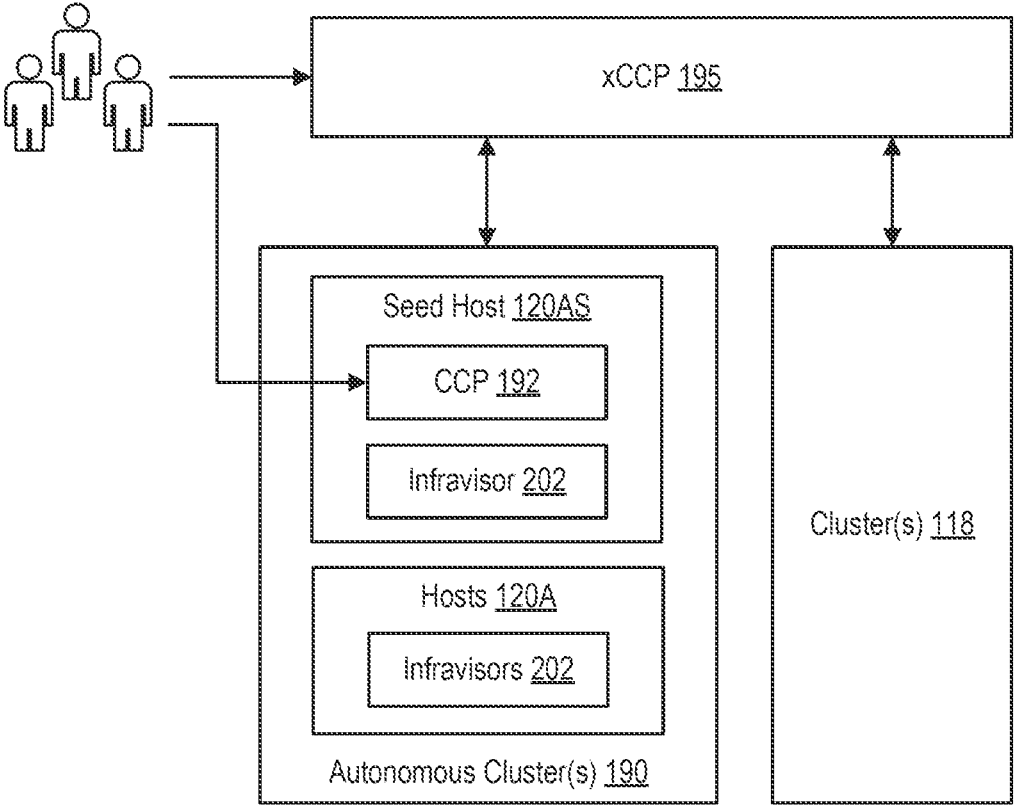
FIG. 1B is a block diagram depicting a high-level view of virtualized computing system 100 according to an embodiment.

FIG. 1B is a block diagram depicting a high-level view of virtualized computing system 100 according to an embodiment. As shown, xCCP 195 manages clusters 118 and autonomous clusters 190. For clusters 118 xCCP 195 is the management and control plane for the hosts therein. For autonomous clusters 190, CCP 192 is the management and control plane for the hosts therein. CCP 192 and xCCP 195 establish a communication channel between them. This allows xCCP to request and receive status information from CCP 192 and to invoke APIs of CCP 192 per requests by users. In some embodiments, users can access APIs of CCP 192 directly to perform various tasks. As described below, a user creates an autonomous cluster 190 with a seed hosts 120AS. Infravisor 202 on seed host 120AS runs CCP 192, provides configuration information to CCP 192, and monitors CCP 192. Other hosts 120A of autonomous cluster 190 have infravisors 202 enabled. If seed host 120AS fails or otherwise becomes unavailable, or if a network partition divides the hosts of autonomous cluster 190 infravisor(s) 202 can start and configure CCP 192 on other host(s) 120A.

Figure 2:
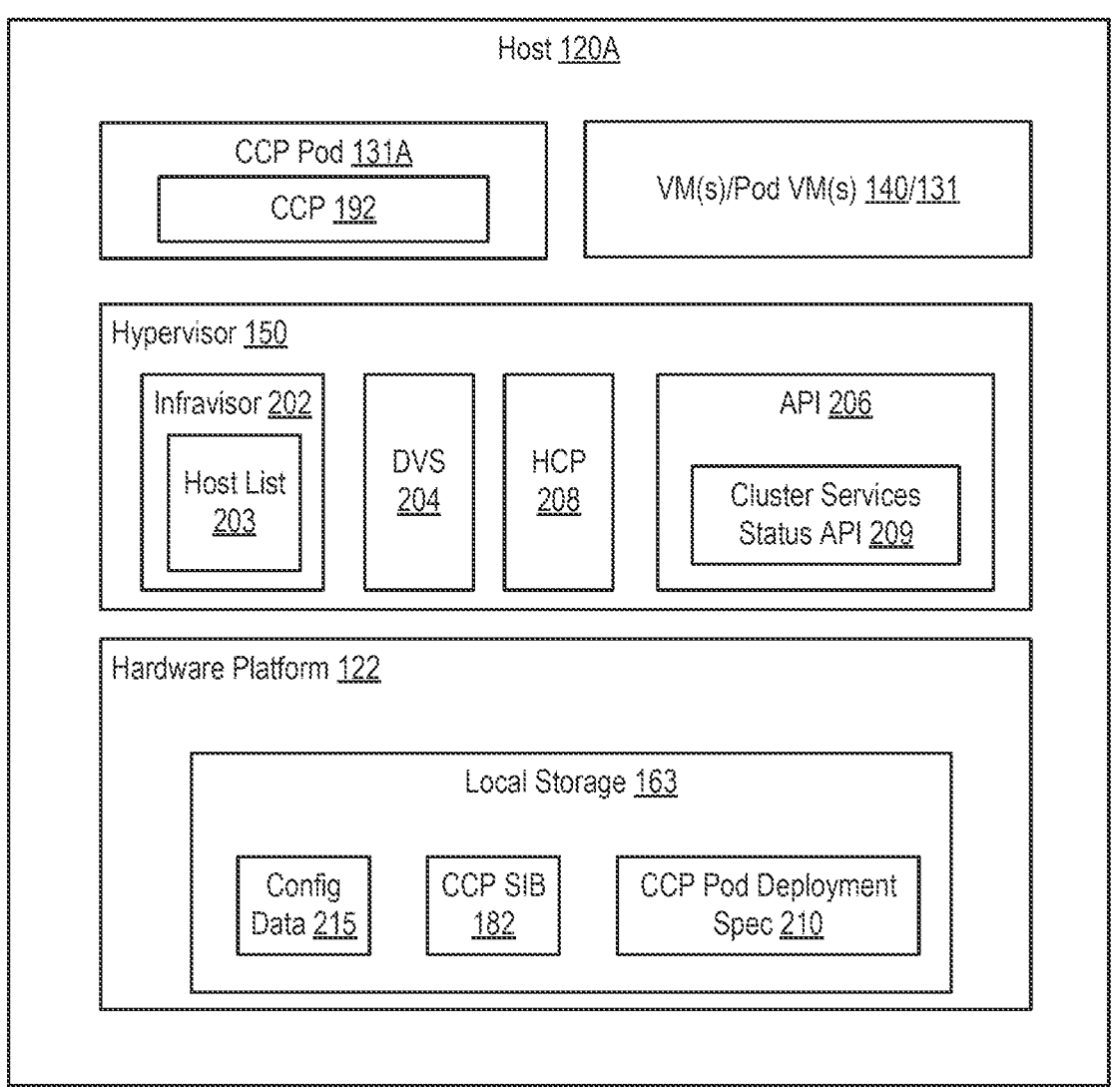
FIG. 2 is a block diagram depicting a host of an autonomous cluster according to an embodiment.

FIG. 2 is a block diagram depicting a host 120A of an autonomous cluster 190 according to an embodiment. Hypervisor 150 of host 120A includes an infravisor 202, a distributed virtual switch (DVS) 204, an application programming interface (API) 206, and a host control plane (HCP) 208. API 206 includes a cluster services status API 209. Infravisor 202 is enabled on each host 120A of an autonomous cluster 190. Infravisor 202 provides a cluster services runtime and is configured for running CCP 192 in a pod VM 131 referred to as CCP pod 131A (i.e., CCP pod 131A is a pod VM 131). Infravisor 202 further manages the availability and lifecycle of CCP pod 131A. From a cluster bootstrap perspective, infravisor 202 is configured to run CCP pod 131A, supply CCP configuration data for CCP 192 to CCP pod 131A, and monitor CCP health. Infravisor 202 manages a host list 203 of hosts 120A in autonomous cluster 190. In embodiments, infravisor 202 includes a distributed key-value store for storing the host list 203 consistently across hosts 120A in autonomous cluster 190.

DVS 204 is a software-defined network switch executing across hypervisors 150 of hosts 120A of an autonomous cluster 190. DVS 204 can include a port group for a management network that enables communication among infravisors 202 of hosts 120A and communication between infravisors 202 and CCP 192. DVS 204 can include another port group for a workload network that enables communication among workloads. DVS 204 includes uplink port groups connected to virtual NICs of hosts 120A.

API 206 includes various APIs for accessing services and data of hypervisor 150, including APIs for accessing HCP 208. During bootstrap of CCP 192, LCM 111 can provide data to HCP 208 through API 206. Once autonomous cluster 190 has been created and at least a seed host added, an LCM in CCP 192 cooperates with HCP 208 in each host 120A through API 206 to manage hypervisor lifecycle. HCP 208 allows LCM software to call for SIB installation and configuration, as described further below. Hypervisor 150 includes config data 215, which includes various configuration data for hypervisor 150, VMs 140/131 (including CCP pod 131A), and CCP 192. Some of config data 215 can be managed by HCP 208, while other of config data 215 can be managed by other components of hypervisor 150. Services such as those of xCCP 195 can access at least a portion of config data 215 through API 206.

Each autonomous cluster 190 includes a seed host, which is one of hosts 120A of the cluster. A user can designate a seed host when requesting autonomous cluster creation or xCCP 195 can select a seed host from a host list provided by the user if the user has not selected a seed host. During the bootstrap workflow, infravisor 202 runs and configures a pod VM 131 to execute CCP 192 in the seed host (CCP pod

131A). The seed host can also include any number of VMs 140 and/or pod VMs 131 executing workloads alongside CCP pod 131A. Only one host in autonomous cluster 190 includes CCP pod 131A. During cluster lifetime, infravisor 202 can run and configure CCP pod 131A on any host 120A in autonomous cluster (e.g., in case of a host failure, host upgrade, etc.).

During bootstrap, HCP 208 obtains CCP SIB 182 from image depot 180. HCP 208 stores CCP SIB 182 in local storage 163 of hardware platform 122. HCP 208 can also store a CCP pod deployment specification (spec) 210 along with CCP SIB 182 (alternatively CCP pod deployment spec 210 can be part of CCP SIB 182). CCP pod deployment spec 210 can be a statically defined configuration file (e.g., a yaml file) of CCP pod 131A (e.g., similar to a Kubernetes pod).

Cluster services status API 209 can be invoked by xCCP 195 to provide status updates with respect to CCP 192 in response to user requests. Cluster services status API 209 provides current status of CCP 192, such as installing, initializing, running, and the like. Cluster services status API 209 can provide details in case of failure. Further, cluster services status API 209 can provide the virtual IP of CCP 192. Cluster services status API 209 retrieves this information directly from CCP pod 131A. In embodiments, CCP pod deployment spec 210 defines liveness, readiness, and startup probes for CCP pod 131A. Infravisor 202 uses the pod liveness, readiness, and startup probes to identify the current status of CCP pod 131A and remediates if necessary. Cluster services status API 209 can obtain bootstrap status from CCP pod 131A by querying infravisor 202, such as querying for a list of running CCP services, obtaining CCP virtual IP, obtaining current status of CCP pod 131A, and the like.

Figure 3:
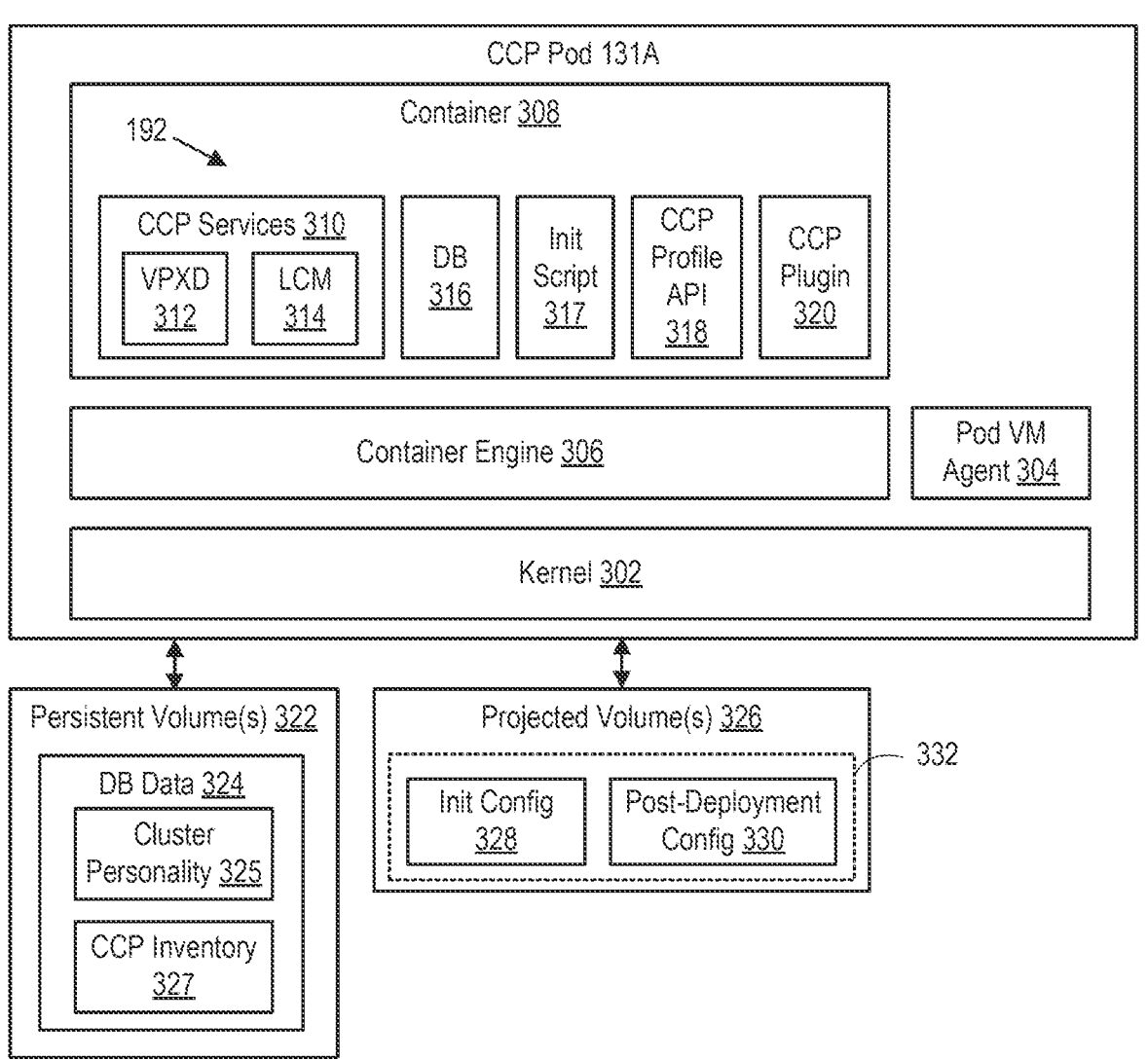
FIG. 3 is a block diagram depicting a cluster control plane (CCP) pod according to an embodiment.

FIG. 3 is a block diagram depicting a CCP pod 131A according to an embodiment. CCP pod 131A is a logical container for all CCP services and is a logical deployment unit of infravisor 202. Infravisor 202 implements CCP pod 131A as a pod VM 131. CCP pod 131A includes a kernel 302, a pod VM agent 304, a container engine 306, and a container 308. Container 308 runs in an execution space managed by container engine 306. The lifecycle of container 308 is managed by infravisor 202 through pod VM agent 304. Pod VM agent 304 monitors CCP health and in case of any problem reports back to infravisor 202 to take appropriate actions and remediate CCP based on its static pod deployment configuration. Both container engine 306 and pod VM agent 304 execute on top of kernel 302 (e.g., a Linux® kernel or derivative thereof). Container engine 306 can be an industry-standard container engine, such as libcontainer, rune, or containerd.

CCP 192 executes inside container 308. CCP 192 includes CCP services 310, database (DB) 316, initialization (init) script 317, CCP profile API 318, and CCP plugin 320. CCP services 310 include VPXD 312 and LCM 314 among other services, which can be the same as or similar to the other VI services 108 discussed above (e.g., DRS, HA, etc.). Infravisor 202 attaches one or more persistent volumes 322 to CCP pod 131A. DB 316 stores its data (DB data 324) to persistent volume 322. CCP services 310 persist state data to DB 316. Infravisor 202 attaches one or more projected volumes 326 (e.g., read-only volumes) to CCP pod 131A. Projected volume(s) 326 store CCP configuration (config) data 332. Infravisor 202 configures networking for CCP pod 131A at startup time.

After CCP pod 131A is started, init script 317 waits for CCP config data 332 to be present and uses it to start and configure CCP services 310. CCP config data 332 includes initial (init) config 328 for CCP services 310 startup and post-deployment config 330 for configuration of CCP services 310 once running. Init config 328 can include install parameters required for initializing CCP services 310. The install parameters can configure CCP services 310 to run in CCP mode. Init script 316 uses init config 328 to start CCP services 310. After CCP services 310 have been started, init script 317 configures CCP 192 to operate as a cluster control plane for a set of hosts 120A using post-deployment config 330. Init script 317 applies post-deployment config 330 to CCP services 310 through CCP profile API 318. In embodiments, init script 317 creates a desired state document from post-deployment config 330 and calls a cluster bootstrap API of CCP profile API 318 using the state document as parametric input. In response, CCP plugin 320 creates a single node cluster from the seed host, configures cluster networking, and configures trust between CCP 192 and xCCP 195 to allow API forwarding.

VPXD 312 maintains a CCP inventory 327, which can include cluster, host, VM, datastore, and network objects managed by CCP 192. LCM 314 is configured to manage cluster personality across hosts 120A of autonomous cluster 190. LCM 314 persists a cluster personality 325 in DB 316. Cluster personality 325 includes an image and a config. The image includes a base hypervisor image and can further include add-ons and/or solutions. Solutions represent agents running on top of the hypervisor base image. In embodiments, CCP 192 is represented as a solution in the image. The config includes all hypervisor configuration along with cluster configuration such as storage and networking. Once CCP 192 is installed, run, and configured on the seed host, and a single node autonomous cluster is formed, LCM 314 takes over and starts managing cluster personality. LCM 314 becomes the only interface for changing cluster personality. During post-deployment configuration, CCP plugin 320 invokes LCM 314 to extract personality (image and config) from the seed host, which LCM 314 stores as cluster personality in DB 316. DB 316 becomes the primary source of truth for cluster personality. When a new host is added to autonomous cluster 190, LCM 314 automatically applies cluster personality 325 to that host. This includes all solutions taken from the seed host, including CCP 192. Thus, a solution for CCP 192 is staged on every host 120A in autonomous cluster 190. This enables infravisor 202 to run CCP 192 on any host 120A in the cluster in case of failover.

Figure 4:
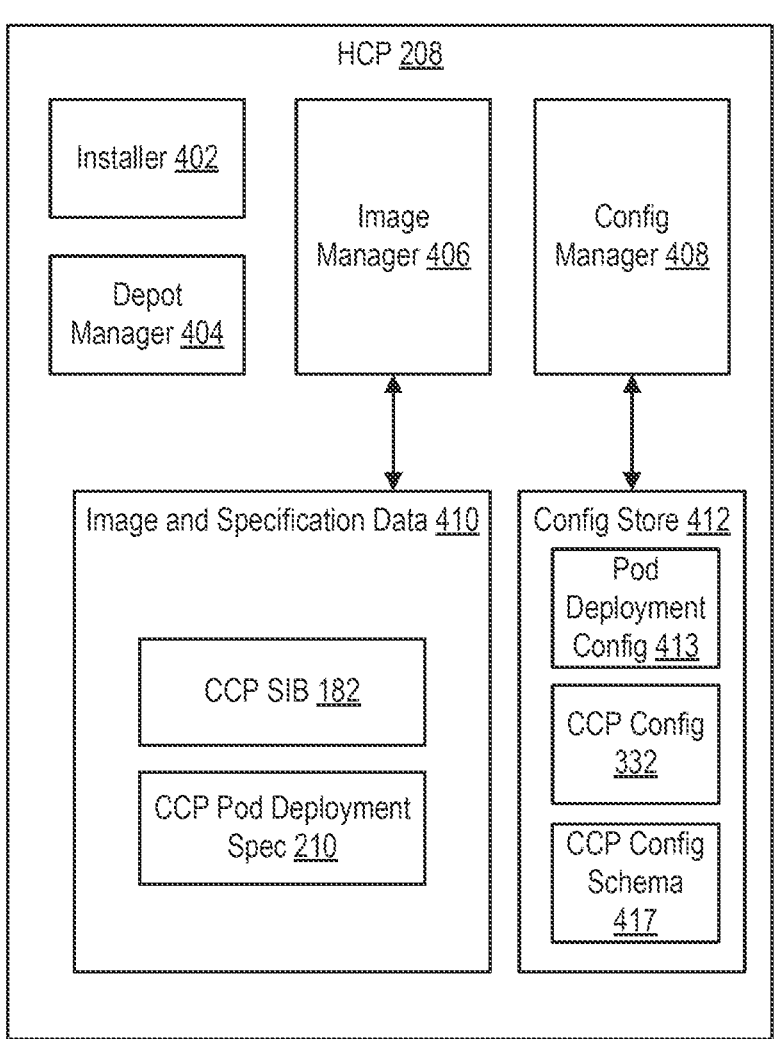
FIG. 4 is a block diagram depicting a host control plane (HCP) according to an embodiment.

FIG. 4 is a block diagram depicting a host control plane (HCP) according to an embodiment. HCP 208 in a host 120A includes an installer 402, a depot manager 404, an image manager 406, and a config manager 408. Image manager 406 is responsible for remediation of host software/image. The host image includes a base image of hypervisor 150, add-ons, and solutions. As described above, solutions can be used to extend a host with new agents. In embodiments, CCP 192 is modeled as such an agent in the context of the host image. Image manager 406 can remediate either a full host image or just apply a specific subsection of a software specification, e.g., a solution. During the bootstrapping process, a host 120A has been selected as a seed host and already includes a desired host image. Image manager 406 can extend the host image of the seed host with CCP as a solution. Applying a CCP solution to the seed host results in installing CCP SIB 182 on the seed host. Image manager 406 downloads CCP SIB 182 using depot manager 404 by passing an image depot uniform resource locator (URL). Image manager 406 can receive a solution specification (spec) from xCCP 195 that identifies CCP SIB 182 and image depot 180 (the image depot URL). Image manager 406 the invokes installer 402 to install CCP SIB 182. Image manager 406 persists image and specification data 410 in local storage 163, which includes CCP SIB 182 and CCP pod deployment spec 210. Infravisor 202 can automatically act and run CCP pod 131A from CCP SIB 182 and CCP pod deployment spec 210.

In embodiments, HCP 208 is configured to convey CCP configuration from xCCP 195 to CCP 192. Config manager 408 facilitates passing CCP configuration from xCCP 195 to infravisor 202 through a config store 412. Config store 412 becomes the primary source of truth for CCP configuration during the bootstrap process. Config store 412 is replicated across hosts 120A in autonomous cluster. In embodiments, image manager 406 obtains a CCP config schema 417 from CCP SIB 182 and persists CCP config schema 417 to config store 417. Config manager 408 receives CCP config 332 from xCCP 195, which populates CCP config schema 417 with desired CCP configuration. CCP config 332 is used to start and configure CCP services 310. Config manager 408 also receives pod deployment config 413 from xCCP 195, which directs infravisor 202 on how to deploy CCP pod 131A. The schema for pod deployment config 413 can be preloaded to config store 412 during installation of an infravisor SIB. Pod deployment config 413 can include, for example, a virtual IP (vIP) within a management network CIDR (classless inter-domain routing) or management network subnet, identification of datastore(s) for the cluster, and the like.

Figure 5:
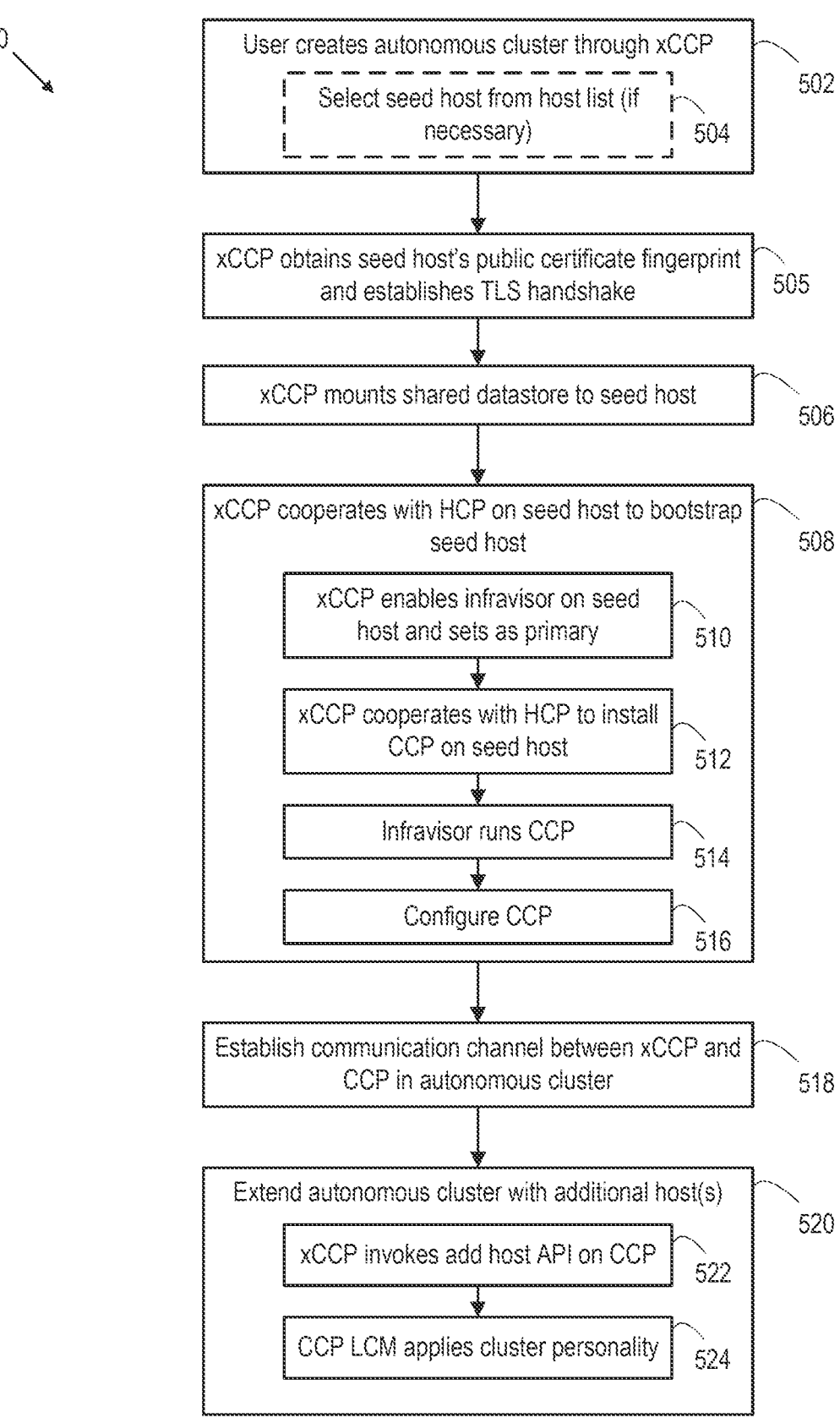
FIG. 5 is a flow diagram depicting a method of bootstrapping a CCP for an autonomous cluster according to embodiments.

FIG. 5 is a flow diagram depicting a method 500 of bootstrapping a CCP for an autonomous cluster according to embodiments. Method 500 begins at step 502, were a user requests creation of an autonomous cluster through xCCP 195 (e.g., using an API of VPXD 109). In embodiments, the user can specify a seed host in a list of hosts 120A for autonomous cluster 190. If the user does not specify a seed host, xCCP 195 can, at step 504, select a seed host from the list of hosts 120A. At step 505, xCCP 195 attempts to reach the seed host and receives a secure sockets layer (SSL) exception with the seed host's fingerprint (also referred to as thumbprint) as specified in the seed host's SSL certificate. VPXD 109 caches the seed host's fingerprint in database 115 and establishes a transport layer security (TLS) handshake with seed host.

At step 506, xCCP 195 mounts datastore 172 to the seed host. At step 508, xCCP 195 cooperates with HCP 208 of the seed host to bootstrap the seed host with CCP 192. In embodiments, at step 510, xCCP 195 enables infravisor 202 on the seed host. At step 512, xCCP 195 cooperates with HCP 208 to install CCP 192 on the seed host. At step 514, infravisor 202 runs CCP 192. At step 516, infravisor 202 configures CCP 192. Steps 512, 514, and 516 are described further below. At step 518, CCP 192 establishes a secure communication channel with xCCP 195.

After step 518, CCP 192 has been bootstrapped and is managing autonomous cluster 190. At step 520, a user or software extends autonomous cluster 190 with additional host(s) (e.g., hosts 120A in the host list or added after the creation process). For example, VPXD 109 in xCCP 195 can automatically request CCP 192 to add each host 120A in the host list provided by a user. A user can also request VPXD 109 to add a host to autonomous cluster 190, in which case VPXD 109 forwards the request to CCP 192. Thus, at step 522, xCCP 195 can invoke an add host API on CCP 192 to add a host 120A to autonomous cluster 190. At step 524, LCM 314 in CCP 192 applies cluster personality 325 to each host 120A added to autonomous cluster 190.

FIG. 6 is a flow diagram depicting a method of installing a CCP to a seed host according to an embodiment. The method of FIG. 6 is performed during step 512 of the method 500 described above. The method begins at step 602, where xCCP 195 provides HCP 208 with pod deployment config 413. Pod deployment config 413 includes information that directs infravisor 202 how to deploy CCP pod 131A. For example, pod deployment config 413 can include vIP address for autonomous cluster 190, the identity of datastore 172, and the like. At step 604, xCCP 195 provides HCP 208 with information for obtaining CCP SIB 182. In embodiments, xCCP 195 provides a solution spec to HCP 208 that identifies CCP SIB 182 and includes an image depot URL for image depot 180.

At step 606, HCP 208 downloads CCP SIB 182, CCP pod deployment spec 210, and CCP config schema 417 from image depot 180. In embodiments, pod deployment spec 210 and CCP config schema 417 can be included as part of CCP SIB 182. At step 608, HCP 208 installs CCI SIB 182 and CCP pod deployment spec 210 to local storage 163 on the seed host. At step 610, HCP 208 adds CCP config schema 417 to config store 412.

Figure 7:
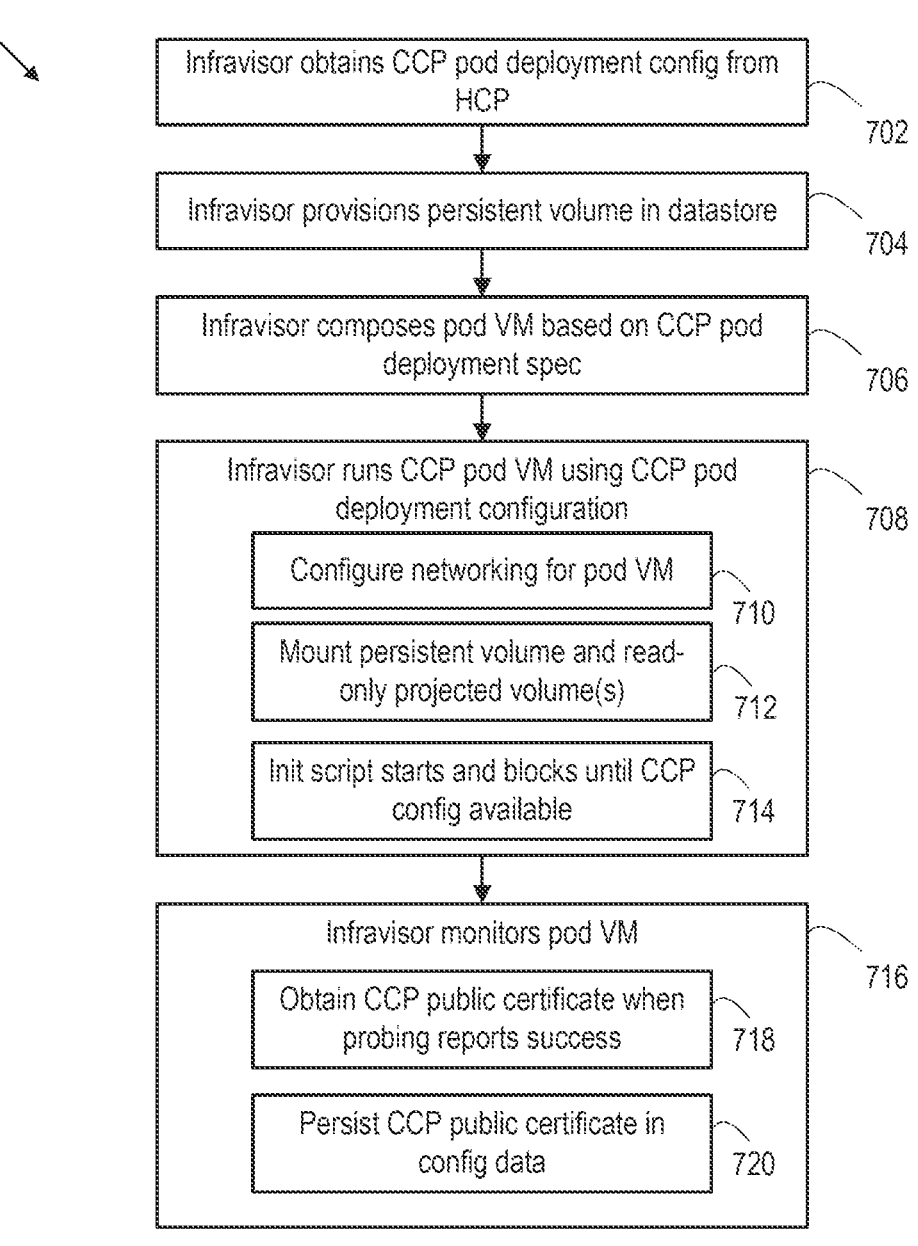
FIG. 7 is a flow diagram depicting a method of running a CCP on a seed host according to embodiments.

FIG. 7 is a flow diagram depicting a method of running a CCP on a seed host according to embodiments. The method of FIG. 7 is performed during step 514 of the method 500 described above. The method begins at step 702, where infravisor 202 obtains CCP pod deployment spec 210 from HCP 208. At step 704, infravisor 202 provisions persistent volume 322 in datastore 172. At step 706, infravisor 202 composes a pod VM 131 based on CCP pod deployment spec 210 to create CCP pod 131A.

At step 708, infravisor 202 runs CCP pod 131A using CCP pod deployment config 413 (provided to HCP 208 by xCCP 195 at step 602). In embodiments, at step 710, infravisor 202 configures networking for CCP pod 131A. Infravisor 202 attaches the virtual NIC of CCP pod 131A to the management network and assigns the cluster vIP specified in CCP pod deployment config 413 (e.g., either statically configured vIP specified in CCP pod deployment config 413 or assigned by dynamic host control protocol (DHCP) within management network subnet specified in CCP pod deployment config 413). At step 712, infravisor 202 mounts persistent volume 322 and projected volume(s) 326 to CCP pod 131A. At step 714, init script 317 starts and blocks until all CCP config 332 is available in projected volume(s) 326. At step 716, infravisor 202 monitors CCP pod 131A through pod VM agent 304. In embodiments, at step 718, infravisor 202 obtains a public certificate of CCP pod 131A when probing reports successful bootstrap of CCP 192. At step 720, infravisor 202 persists the CCP's public certificate in config data 215 for access by xCCP 195.

As discussed above, in step 518, a communication channel is established between CCP 192 and xCCP 195. Once infravisor 202 determines that configuration of CCP 192 has succeeded, infravisor 202 obtains CCP's public certificate, which includes CCP's fingerprint. After bootstrap, CCP's public certificate can be a self-generated certificate. Infravisor 202 persists CCP's public certificate to config data 215 for access by xCCP 195. VPXD 109 in xCCP 195 obtains CCP's public certificate and fingerprint from config store 412. VPXD 109 can then perform a TLS handshake with CCP 192 using the vIP. Once the TLS handshake has been established, CCP 192 can generate a certificate signing request (CSR) and provide the CSR to xCCP 195, which then generates a new public certificate for CCP 192 under its management. VPXD 109 in xCCP 195 then updates CCP's certificate and instructs CCP 192 to reboot. In this manner, a secure communication channel is established between CCP 192 and xCCP 195.

FIG. 8 is a flow diagram depicting a method of configuring a CCP on a seed host according to embodiments. The method of FIG. 8 is performed during step 516 of method 500 of FIG. 5 described above. The method begins at step 802, where xCCP 195 provides CCP config 332 to HCP 208 on the seed host. As described above, the schema for CCP config 332 has been installed to config store 412 (CCP config schema 417) during the CCP installation process (step 610). CCP config 332 includes init config 328 that includes the install parameters for CCP services 310 and post-deployment config 330 for configuring CCP services 310 to establish CCP 192 for autonomous cluster 190.

At step 804, infravisor 202 obtains CCP config 332 from config store 412 and injects CCP config 332 into projected volume(s) 326. At step 806, init script 317 unblocks once CCP config 332 is available on projected volume(s) 326. In embodiments, at step 808, init script 317 reads init config 328 from projected volume(s) 326. At step 810, init script 317 sets install parameters of CCP services 310 based on init config 328. At step 812, init script 317 starts CCP services 310. At step 814 init script 317 reads post-deployment config 330 from projected volume(s) 326. At step 816, init script 317 creates a desired state document from post-deployment config 330, which describes the desired state of CCP 192 and its CCP services 310. At step 818, init script 317 applies the desired state to CCP 192 through CCP profile API 318.

Figure 9:
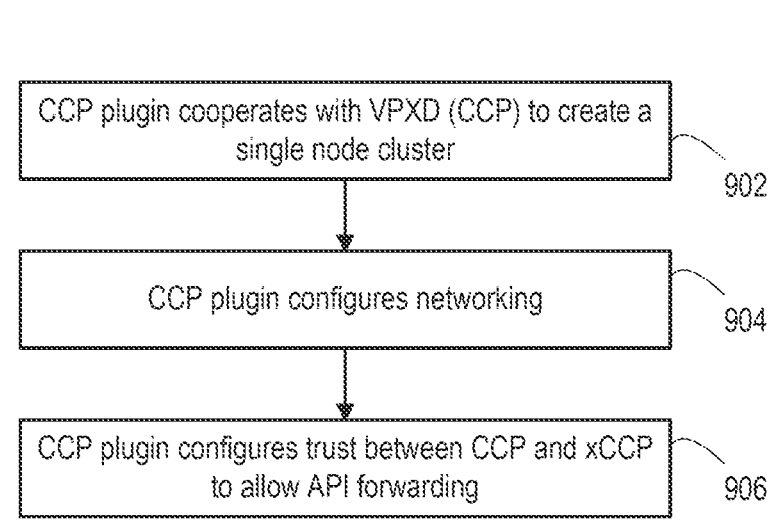
FIG. 9 is a flow diagram depicting a method of applying a desired state derived from a CCP post-deployment configuration to a CCP executing on a host according to embodiments.

FIG. 9 is a flow diagram depicting a method 900 of applying a desired state derived from a CCP post-deployment configuration to a CCP executing on a host according to embodiments. Method 900 is performed by CCP plugin 320 in response to invocation of CCP profile API 318 by init script 317, which supplies the desired state. Method 900 begins at step 902, where CCP plugin 320 cooperates with VPXD 312 of CCP 192 to create a single node cluster having the seed host. At step 904, CCP plugin 320 configures networking for CPP 192. Network configuration can include, for example, creating DVS 204, creating port groups on DVS 204, adding the seed host to DVS 204, and the like. At step 906, CCP plugin 320 configures trust between CCP 192 and xCCP 195 to allow for API forwarding. A user can request CRUD operations for autonomous cluster 190 through xCCP 195, which forwards the operations to CCP 192 using the established trust relationship.

Figure 10:
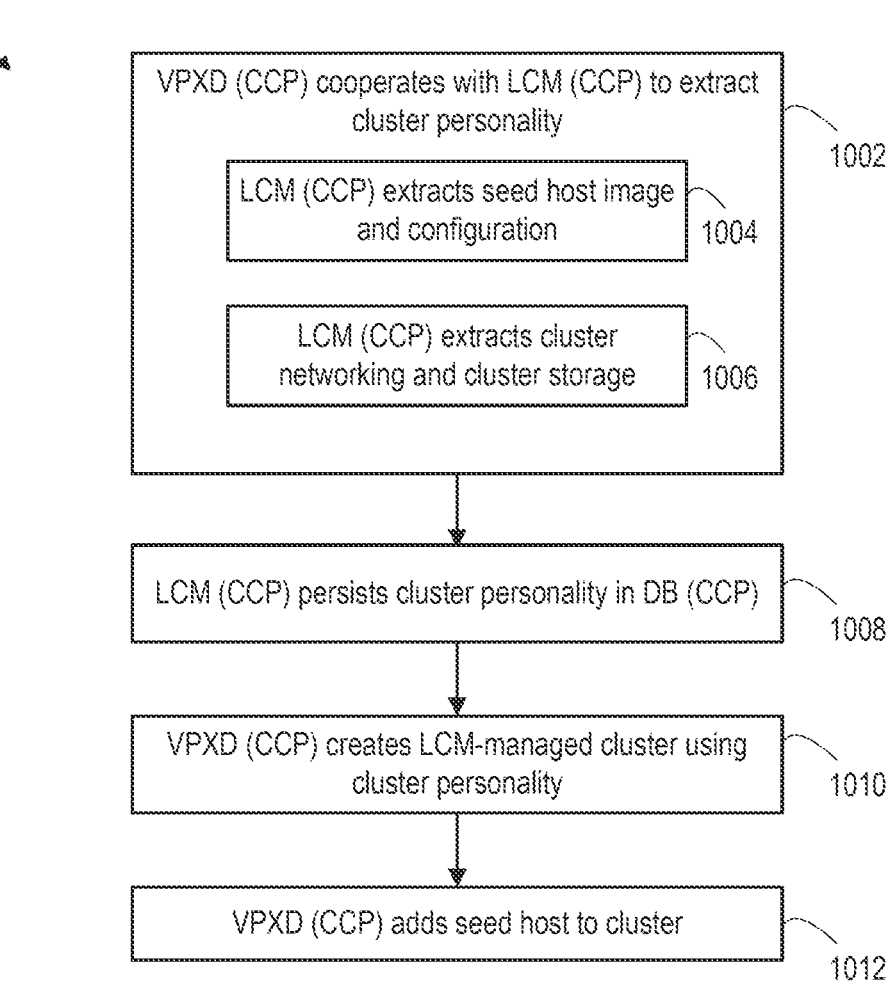
FIG. 10 is a flow diagram depicting a method of creating a single node cluster having the seed host according to embodiments.

FIG. 10 is a flow diagram depicting a method 1000 of creating a single node cluster having the seed host according to embodiments. Method 1000 begins at step 1002, where VPXD 312 of CCP 192 cooperates with LCM 314 of CCP 192 to extract cluster personality 325 from the seed host. In embodiments, at step 1004, LCM 314 extracts a host image and a configuration of the host image from the seed host (e.g., base image, add-ons, solutions). At step 1006, LCM 314 extracts cluster networking and cluster storage information from the seed host. At step 1008, LCM 314 of CCP 192 persists cluster personality 325 to DB 316 of CCP 192. At step 1010, VPXD 312 of CCP 192 creates an LCM-managed cluster using cluster personality 325. At step 1012, VPXD 312 adds the seed host to the cluster.

FIG. 11 is a flow diagram depicting a method 1100 of adding hosts to a bootstrapped autonomous cluster according to embodiments. Method 1100 begins at step 1102, where a user or software (e.g., VPXD 109) adds a host to autonomous cluster 190 through xCCP 195. At step 1104, xCCP 195 forwards the add host request to CCP 192 in autonomous cluster 190. At step 1106, CCP 192 adds host to autonomous cluster 190. At step 1108, CCP 192 remediates the added host using cluster personality 325. At step 1110, CCP 192 enables infravisor 202 on the added host. In embodiments, autonomous cluster includes a hub-and-spoke configuration of infravisors 202. The configuration includes a primary infravisor (hub) and a plurality of non-primary infravisors (spokes). The primary infravisor executes the CCP pod on its respective host. Thus, after bootstrap, the seed host includes the primary infravisor. Hosts subsequently added to autonomous cluster have their infravisors configured as non-primary, since only one instance of CCP 192 executes in autonomous cluster 190. At step 1112, if there are more hosts to add, method 1100 returns to step 1102 and repeats. Otherwise, method 1100 proceeds to step 1114, where CCP 192 reports cluster creation or host addition to xCCP 195.

Figure 12:
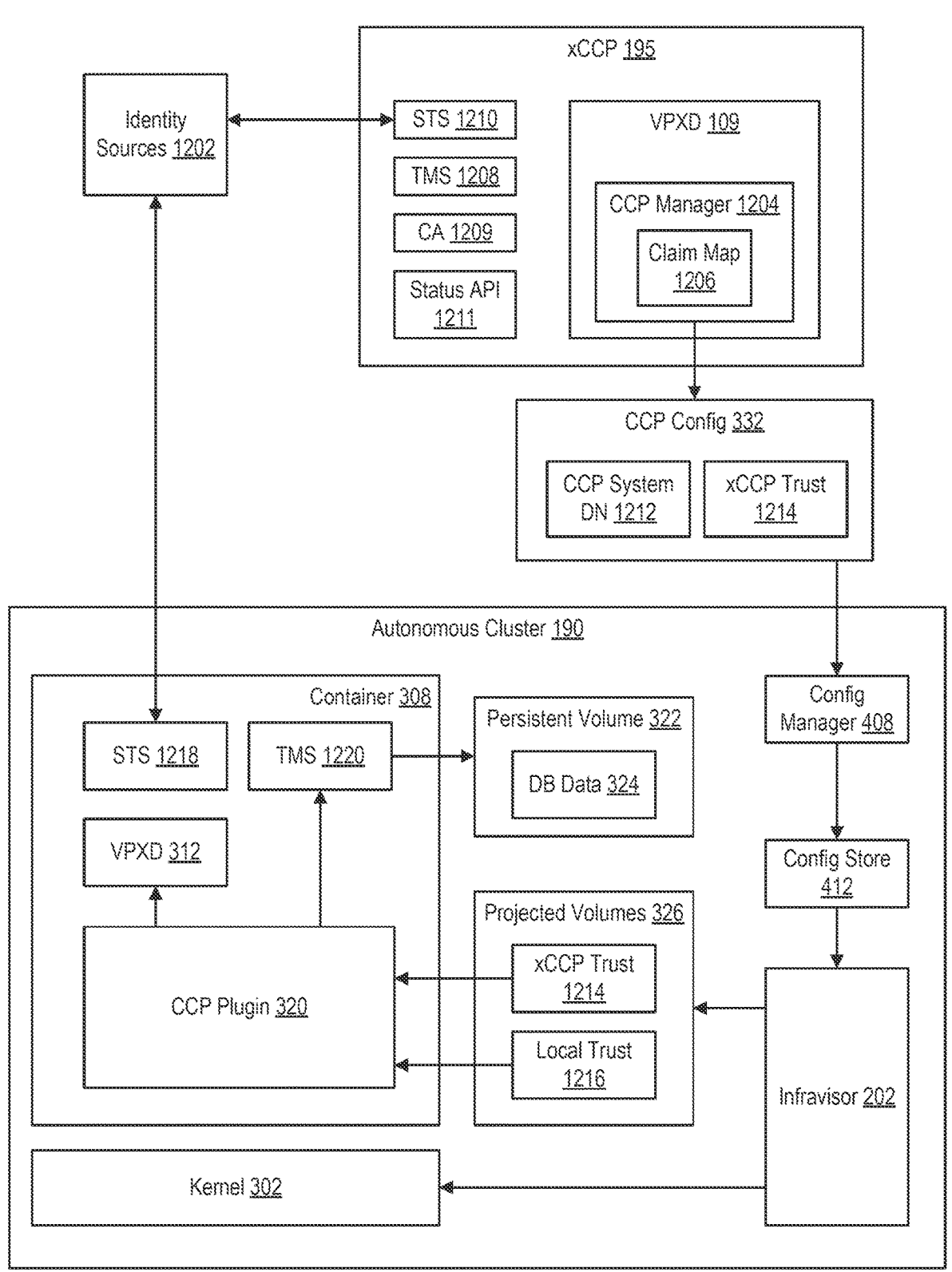
FIG. 12 is as block diagram depicting trust, authorization, and authentication logic of an xCCP and an autonomous cluster according to embodiments.

FIG. 12 is as block diagram depicting trust, authorization, and authentication logic of xCCP 195 and autonomous cluster 190 according to embodiments. xCCP 195 includes a security token service (STS) 1210, a trust management service (TMS) 1208, a certificate authority (CA) 1209, and a status API 1211. xCCP 195 provides security by using certificates to encrypt communications, authenticate users and services, and sign tokens. For example, SSL certificates are used to establish TLS handshakes and encrypt communications between two nodes, such as virtualization management server 116 and a host 120. Services can have public certificates (also referred to as solution certificates) to verify identity to other services. Signing certificates are used to sign tokens for authenticated users or services, such as security assertion markup language (SAML) tokens or the like. In embodiments, CA 1209 is configured to create the SSL, solution, and signing certificates. TMS 1208 is configured to store and manage local trust data for xCCP 195, which includes at least the signing certificates used by STS 1210.

STS 1210 is configured to authenticate and sign tokens for authenticated users and services. The tokens can include authorization information to be presented to services being accessed on behalf of the users other services. STS 1210 can obtain authorization information (e.g., user groups, roles, permissions, etc.) from identity sources 1202, which can include lightweight directory access protocol (LDAP) sources or the like. TMS 1208 can further store identity source information related to accessing identity sources 1202. CCP manager 1204 is configured to manage one or more autonomous clusters 190, such as generating and providing CCP config 332 for each autonomous cluster. CCP manager 1204 includes claim map 1206, which maps groups of xCCP 195 to groups of CCP 192. Status API 1211 is configured to cooperate with cluster services status API 209 to obtain the result of the progress and initialization of CCP 192 for each autonomous cluster 190. Status API 1211 also tracks the progress of the running workflows related to creation of autonomous clusters 190.

FIG. 13 is a flow diagram depicting a method 1300 of bootstrapping trust between an xCCP and an autonomous cluster according to an embodiment. Method 1300 can be understood with respect to FIG. 12. Method 1300 begins at step 1302, where the user invokes the create autonomous cluster API. At step 1304, VPXD 109 in xCCP 195 calls TMS 1208 to obtain signing certificate(s) and identity source information. At step 1306, VPXD 109 adds the signing certificate(s), identity source information, and claim map 1206 to post-deployment config 330. At step 1308, VPXD 109 adds CCP system domain name (DN) to init config 328. At step 1310, VPXD 109 provides CCP config 332 having CCP system DN 1212 and xCCP trust 1214 to config manager 408 in seed host 120AS (shown in FIG. 1B) in autonomous cluster 190. Config manager 408 stores CCP config 332 in config store 412, as described above.

At step 1312, infravisor 202 runs CCP pod 131A (shown in FIG. 2) and provides xCCP trust 1214 (as part of CCP config 332) and local trust 1216 in projected volume(s) 326. Local trust 1216 can include, for example, an SSL certificate of seed host 120AS (shown in FIG. 1B). At step 1314, infravisor 202 cooperates with kernel 302 (e.g., through pod VM agent 304 shown in FIG. 3) to set CCP system DN 1212. At step 1316, CCP plugin 320 provides local trust 1216 to VPXD 312 in CCP 192 (shown in FIG. 1B). This enables VPXD 312 to communicate with hypervisor 150 (shown in FIG. 1A) of seed host 120AS (e.g., call API 206 shown in FIG. 2). CCP plugin 320 also provides xCCP trust 1214 to a TMS 1220 in CCP 192 (shown in FIG. 1B). At step 1318, TMS 1220 in CCP 192 (shown in FIG. 1B) persists xCCP trust 1214 in database 316 (shown in FIG. 3). At step 1320, an STS 1218 in CCP 192 (shown in FIG. 1B) can obtain identity source information, claim map, and xCCP signing certificate(s) from database 316 (shown in FIG. 3) (e.g., to authenticate a user or a service).

FIG. 14 is a flow diagram depicting a method 1400 of invoking an API of CCP in an autonomous cluster according to an embodiment. For example, a user can invoke an API to obtain health of CCP or to add a host to autonomous cluster 190. Method 1400 begins at step 1402, where a user logs into STS 1210 of xCCP 195 (e.g., with username and password). At step 1404, STS 1210 authenticates the user and issues a signed security token having the user's identity. At step 1406, the user logs into VPXD 109 with the user's security token and invokes an API targeting CCP 192 in autonomous cluster 190.

At step 1408, VPXD 109 cooperates with STS 1210 and acquires an "act as" security token for a VPXD solution user. At step 1410, VPXD 109 cooperates with STS 1218 in CCP 192 to exchange its security token with the security token of VPXD 312 in CCP 192. STS 1218 allows this action since trust was established during cluster creation. At step 1412, STS 1218 verifies against the established trust to provide the security token of VPXD 312 in CCP 192. At step 1414, VPXD 109 logs into VPXD 312 of CCP 192 using the security token of VPXD 312. At step 1416, VPXD 109 invokes an API of VPXD 312 as requested by the user (e.g., implements API forwarding).

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of establishing trust between a cross-cluster control plane (xCCP) and a cluster control plane (CCP) of an autonomous cluster of hosts in a virtualized computing system, the method comprising:

providing, by the xCCP, first trust data of the xCCP to the autonomous cluster, the xCCP obtaining the first trust data from a first trust management service (TMS) of the xCCP, a first host of the autonomous cluster executing a first infravisor and a second host of the autonomous cluster executing a second infravisor in communication with the first infravisor;

executing, by one of the first infravisor or the second infravisor, the CCP in the first host;

providing, by the hypervisor of the first host, the first trust data to the CCP through a volume attached to a virtual machine (VM) that executes the CCP;

providing, by the first infravisor, second trust data, obtained from the hypervisor of the first host, and an initial config, through the volume attached to the VM;

executing, by the CCP, the initial config to start services thereof, including a management service and a second TMS;

providing, by the CCP, the second trust data to the management service thereof to enable communication between the management service and the hypervisor of the first host;

providing, by the CCP, the first trust data to the second TMS of the CCP;

persisting, by the CCP, the first trust data in a database; and accessing, by a security token service (STS) of the CCP, the first trust data in the database to authenticate access to the CCP by the xCCP.

2. The method of claim 1, wherein the first trust data includes a signing certificate of the xCCP used to sign security tokens issued to users and services of the xCCP.

3. The method of claim 2, wherein the first trust data further includes identity source information for accessing at least one identity source having user identity and authorization information.

4. The method of claim 1, further comprising:

providing, by the xCCP, a claim map to the hypervisor, the claim map mapping groups of the xCCP to groups of the CCP.

5. The method of claim 1, further comprising:

providing, by the xCCP, a system domain name to the hypervisor, the system domain name being for the CCP.

6. The method of claim 1, wherein the hypervisor includes the first infravisor or the second infravisor configured to cooperate with an agent in the VM, and wherein the step of providing the first trust data is performed by the infravisor.

7. The method of claim 1, wherein the STS of the CCP accesses the first trust data in the database to authenticate application programming interface (API) forwarding from the xCCP to the CCP.

8. A non-transitory computer readable medium comprising instructions to be executed in a computing device to cause the computing device to carry out a method of establishing trust between a cross-cluster control plane (xCCP) and a cluster control plane (CCP) of an autonomous cluster of hosts in a virtualized computing system, the method comprising:

providing, by the xCCP, first trust data of the xCCP to the autonomous cluster, the xCCP obtaining the first trust data from a first trust management service (TMS) of the xCCP, a first host of the autonomous cluster executing a first infravisor and a second host of the autonomous cluster executing a second infravisor in communication with the first infravisor;

executing, by one of the first infravisor or the second infravisor, the CCP in the first host;

providing, by the hypervisor of the first host, the first trust data to the CCP through a volume attached to a virtual machine (VM) that executes the CCP;

providing, by the first infravisor, second trust data, obtained from the hypervisor of the first host, and an initial config, through the volume attached to the VM;

executing, by the CCP, the initial config to start services thereof, including a management service and a second TMS;

providing, by the CCP, the second trust data to the management service thereof to enable communication between the management service and the hypervisor of the first host;

providing, by the CCP, the first trust data to the second TMS of the CCP;

persisting, by the CCP, the first trust data in a database; and accessing, by a security token service (STS) of the CCP, the first trust data in the database to authenticate access to the CCP by the xCCP.

9. The non-transitory computer readable medium of claim 8, wherein the first trust data includes a signing certificate of the xCCP used to sign security tokens issued to users and services of the xCCP.

10. The non-transitory computer readable medium of claim 9, wherein the first trust data further includes identity source information for accessing at least one identity source having user identity and authorization information.

11. The non-transitory computer readable medium of claim 8, further comprising:

providing, by the xCCP, a claim map to the hypervisor, the claim map mapping groups of the xCCP to groups of the CCP.

12. The non-transitory computer readable medium of claim 8, further comprising:

providing, by the xCCP, a system domain name to the hypervisor, the system domain name being for the CCP.

13. The non-transitory computer readable medium of claim 8, wherein the hypervisor includes the first infravisor or the second infravisor configured to cooperate with an agent in the VM, and wherein the step of providing the first trust data is performed by the infravisor.

14. The non-transitory computer readable medium of claim 8, wherein the STS of the CCP accesses the first trust data in the database to authenticate application programming interface (API) forwarding from the xCCP to the CCP.

15. A virtualized computing system, comprising:

a cross-cluster control plane (xCCP); and a first host of an autonomous cluster, the first host having a hardware platform comprising a central processing unit (CPU) and a memory, the first host executing a hypervisor on the hardware platform, the hypervisor supporting a virtual machine (VM) executing a cluster control plane (CCP) of the autonomous cluster;

a second host of the autonomous cluster, the second host executing a second infravisor in communication with a first infravisor in the hypervisor of the first host, the first infravisor or the second infravisor configured to select the first host to execute the CCP;

wherein the xCCP is configured to provide first trust data, obtained from a first trust management service (TMS) of the xCCP, to the hypervisor and the hypervisor is configured to provide the first trust data to the CCP through a volume attached to the VM;

wherein the first infravisor is configured to provide second trust data, obtained from the hypervisor of the first host, and an initial config, through the volume attached to the VM;

wherein the CCP is configured to execute the initial config to start services thereof, including a management service and a second TMS;

wherein the CCP is configured to provide the second trust data to the management service thereof to enable communication between the management service and the hypervisor of the first host;

wherein the CCP is configured to provide the first trust data to the second TMS of the CCP and persist the first trust data in a database of the CCP; and wherein a security token service (STS) of the CCP is configured to access the first trust data in the database to authenticate access to the CCP by the xCCP.

16. The virtualized computing system of claim 15, wherein the first trust data includes a signing certificate of the xCCP used to sign security tokens issued to users and services of the xCCP.

17. The virtualized computing system of claim 16, wherein the first trust data further includes identity source information for accessing at least one identity source having user identity and authorization information.

18. The virtualized computing system of claim 15, wherein the xCCP provides a claim map to the hypervisor, the claim map mapping groups of the xCCP to groups of the CCP.

19. The virtualized computing system of claim 15, wherein the hypervisor includes the first infravisor configured to cooperate with an agent in the VM, and wherein infravisor provides the first trust data to the CCP.

20. The virtualized computing system of claim 15, wherein the STS of the CCP accesses the first trust data in the database to authenticate application programming interface (API) forwarding from the xCCP to the CCP.

* * * * *